US009720304B2

United States Patent
Zhu et al.

(10) Patent No.: US 9,720,304 B2
(45) Date of Patent: Aug. 1, 2017

(54) METHOD AND DEVICE FOR CONTROLLING A FLASH LIGHT

(71) Applicant: Xiaomi Inc., Beijing (CN)

(72) Inventors: Dan Zhu, Beijing (CN); Feng Guo, Beijing (CN); Wei Sun, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 15/139,983

(22) Filed: Apr. 27, 2016

(65) Prior Publication Data

US 2016/0342071 A1 Nov. 24, 2016

(30) Foreign Application Priority Data

May 19, 2015 (CN) .......................... 2015 1 0257280

(51) Int. Cl.
*G03B 17/00* (2006.01)
*G03B 15/05* (2006.01)
*G03B 7/16* (2014.01)
*H05B 33/08* (2006.01)
*H05B 37/02* (2006.01)

(52) U.S. Cl.
CPC ............. *G03B 15/05* (2013.01); *G03B 7/16* (2013.01); *H05B 33/0854* (2013.01); *H05B 37/0227* (2013.01)

(58) Field of Classification Search
CPC ............ G03B 15/05; G03B 2215/0582; H04N 5/2256; H04N 5/2354
USPC .......................................................... 396/62
See application file for complete search history.

(56) References Cited

U.S. PATENT DOCUMENTS

| 5,347,339 | A | 9/1994 | Terada et al. | |
|---|---|---|---|---|
| 8,314,880 | B2 | 11/2012 | Matsui | |
| 9,332,179 | B2* | 5/2016 | Povlick | H04N 5/23229 |
| 2002/0061190 | A1 | 5/2002 | Kawasaki et al. | |
| 2005/0122420 | A1 | 6/2005 | Matsui | |
| 2005/0248677 | A1* | 11/2005 | Katagiri | H04N 5/2354 |
| | | | | 348/333.02 |
| 2005/0265014 | A1 | 12/2005 | Matsui et al. | |
| 2006/0034602 | A1* | 2/2006 | Fukui | H04N 5/23293 |
| | | | | 396/263 |
| 2006/0045501 | A1 | 3/2006 | Liang et al. | |
| 2008/0298792 | A1* | 12/2008 | Clark | G03B 17/00 |
| | | | | 396/56 |

(Continued)

FOREIGN PATENT DOCUMENTS

| CN | 104601893 A | 5/2015 |
|---|---|---|
| JP | 02-135327 A | 5/1990 |

(Continued)

OTHER PUBLICATIONS

International Search Report corresponding to International Application No. PCT/CN2015/090653 dated Feb. 19, 2016, (2p).

(Continued)

Primary Examiner — Tung X Le

(57) ABSTRACT

A method, a device, and a terminal are provided for controlling a flash light. In the method, the device obtains position data of an object to be photographed. The device determines a parameter of the flash light with respect to the object to be photographed based on the position data. Depending on different positions of the object to be photographed, different parameters of flash light are provided to the flash light to obtain a clear image.

18 Claims, 5 Drawing Sheets

(56) References Cited

U.S. PATENT DOCUMENTS

| | | | | |
|---|---|---|---|---|
| 2009/0201384 | A1* | 8/2009 | Kang | .................... H04N 5/247 |
| | | | | 348/222.1 |
| 2009/0310013 | A1 | 12/2009 | Odaka | |
| 2011/0317988 | A1 | 12/2011 | Lee | |
| 2012/0262571 | A1* | 10/2012 | Wang | .................. H04N 5/2354 |
| | | | | 348/135 |

FOREIGN PATENT DOCUMENTS

| | | | |
|---|---|---|---|
| JP | 2008122463 | A | 5/2008 |
| KR | 10-0524223 | | 12/2005 |
| KR | 10-1062977 | | 7/2011 |
| KR | 1020140118185 | | 8/2014 |
| KR | 20150039019 | A | 4/2015 |

OTHER PUBLICATIONS

Office Action for Korean Application No. 044712461 dated Sep. 5, 2016.
International Search Report for Application No. PCT/CN2015/090653 dated Feb. 19, 2016.
Extended European Search Report for Application No. 16158653.2 dated Jul. 28, 2016.
Office Action and English translation for Russian Patent Application No. 2016112905/28 dated May 22, 2017, 12 pages.

* cited by examiner

METHOD AND DEVICE FOR CONTROLLING A FLASH LIGHT

The present application is based upon and claims priority to Chinese Patent Application No. 201510257280.9, filed May 19, 2015, the entire contents of which are incorporated herein by reference.

TECHNICAL FIELD

The present disclosure generally relates to the technical field of photographing, and more particularly, to a method and a device for controlling a flash light and a terminal that implements the method.

BACKGROUND

A flash light is typically used for instantaneous lighting in a dim environment or locally supplementing light in a bright environment. When a camera photographs in a dark environment, the flash light typically flashes for a first time, and then flashes at a fixed light intensity and brightness to supplement light for the photographing.

In the related art, the light of the same intensity will be flashed regardless of a distance of an object to be photographed, resulting overexposure and unclear image in case where the object to be photographed is close to the camera and insufficient exposure and still unclear image in case where the object to be photographed is far from the camera.

SUMMARY

According to a first aspect of the present disclosure, there is provided a method for controlling a flash light, including: obtaining position data of an object to be photographed; and determining a parameter of the flash light with respect to the object to be photographed based on the position data.

According to a second aspect of the present disclosure, there is provided a terminal. The terminal includes: a processor; and a memory for storing instructions executable by the processor. The processor is configured to perform: obtaining position data of an object to be photographed; and determining a parameter of the flash light with respect to the object to be photographed based on the position data.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

The terminology used in the description of the disclosure herein is for the purpose of describing particular examples only and is not intended to be limiting of the disclosure. As used in the description of the disclosure and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

It should be understood, although elements may be described as terms first, second, third or the like in the present disclosure, the elements are not limited by these terms. Rather, these terms are merely used for distinguishing elements of the same type. For example, a first element can also be referred to as a second element, and similarly, a second element can also be referred to as a first element, without departing from the scope of the present disclosure. Depending on the context, as used herein, the word "if" can be interpreted as "at the time when", "when" or "in response to."

Figure 1:
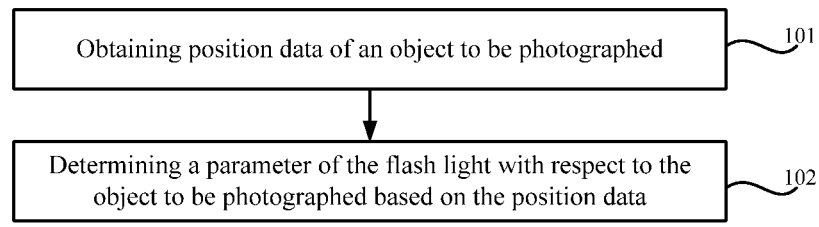
FIG. 1 is a flow chart of a method for controlling a flash light according to an exemplary embodiment of the present disclosure.

As shown in FIG. 1, FIG. 1 is a flow chart of a method for controlling a flash light according to an exemplary embodiment, which may be implemented in a terminal, including the following steps.

In step 101, the terminal obtains position data of an object to be photographed.

In the present disclosure, the terminal may be any smart terminal capable of photographing and having a flash light, such as a smart mobile phone, a tablet computer, a Personal Digital Assistant (PDA), or can be a digital camera such as a camera of any kind, or can be a hand held flash light device or the like. In the present disclosure, the flash light (sometimes also referred to as a camera flash or simply a flash) may be a light-emitting diode (LED). The terminal may also be a wearable device configured to communicate with a device including the flash light.

In this step of the present disclosure, the position data of the object to be photographed is obtained. The terminal may obtain the position data by obtaining the size and position of an object in a picture frame. In one example, the appropriate position of an object can be determined by the positions of the lens moved in a camera. In another example, the appropriate position of an object can be determined by laser range finding. The position data may include a distance between the object to be photographed and the flash light and an angle formed by the object to be photographed and the flash light (that is, an angle formed by a line crossing the flash light as a point and a highest point of the object to be photographed, and a line crossing the flash light and a lowest point of the object to be photographed).

In step 102, the terminal determines a parameter of the flash light with respect to the object to be photographed based on the position data.

In the present disclosure, a current to be provided to the flash light may be determined based on the position data. Then based on the current, a parameter of the flash light with respect to the object to be photographed may be determined. The parameter of the flash light may include a light intensity of the light emitted by the flash light, or may include a light emitting angle. It can be understood that the above current can be replaced by a voltage. For illustration, the embodiments of the present disclosure are described using the current as an example.

In the present disclosure, in order to solve the problem that providing a light of the same intensity regardless of the position of the object to be photographed will result in overexposure or unclear image, different parameters of the flash light are provided based on the different positions of the object to be photographed, to ensure that the object to be photographed will obtain the approximately same light regardless of its distance from the flash light. In order to achieve the above objective, a relationship table including position data of the object to be photographed and associated current parameters may be previously stored in the device including flash light, and by searching the previously stored relationship table, the current corresponding to the obtained position data may be calculated. Then the flash light is driven by the current, to achieve a desirable photographing effect.

In addition, positions of objects to be photographed may be divided by using a plurality of preset planes located at different distances from the flash light. For example, the plurality of preset planes may include a first virtual plane close to the flash light and a second virtual plane far away from the flash light. Accordingly, preset fixed currents may be provided respectively for an object to be photographed which is located closer than the first virtual plane close to the flash light and an object to be photographed which is located farther than the second virtual plane far away from the flash light. Specifically, the terminal may compare the position data with the first virtual plane and the second virtual plane. When the object is located closer than the first virtual plane, a stored first preset current is retrieved as the current to be provided to the flash light. When the object is located between the first virtual plane close to the flash light and the second virtual plane far away from the flash light, the terminal may calculate the current to be provided to the flash light based on the obtained position data and a current parameter retrieved from a predetermined relationship table including position data and associated current parameters. When the obtained position is father than the second virtual plane far away from the flash light, a stored second preset current is retrieved as the current to be provided to the flash light. The flash light described in the disclosure may be one flash light, and different parameters of the flash light may be provided based on different positions of the object to be photographed.

In the present disclosure, the flash light may include two or more flash lights. For example, the flash light may include a first flash light and a second flash light, respectively to provide a first light having a first light intensity and a second light having a second light intensity, and a combined light of the first light and the second light illuminates the object to be photographed. The first flash light and the second flash light may be located in the same plane.

In the present disclosure, the first light intensity and the second light intensity may be identical or may be different. If the light intensities are different, one is at least 1.5 times of the other. The current to be provided to the flash light includes a first current to be provided to the first flash light and a second current to be provided to the second flash light, and the light emitting angle of the flash light is determined based on a first light emitting angle of the first light and a second light emitting angle of the second light. The first current controls the output of first flash light and the second current controls the output of second flash light.

In the present disclosure, after the light intensity is determined, the light emitting angle of the flash light can be determined. In case of double flash lights, after the first light intensity and the second light intensity are determined, it can be determined which one of them is larger. If the first light intensity is lower than the second light intensity, the first light emitting angle is determined as larger than the second light emitting angle, and if the first light intensity is larger than the second light intensity, the first light emitting angle is determined as smaller than the second light emitting angle. In the terminal, light emitting angles can be implemented by lenses. For example, a first lens provides the first light emitting angle and a second lens provides the second light emitting angle.

In the embodiments of the present disclosure, the light emitting angle can be a larger one of a product of the first light emitting angle and a first weight and a product of the second light emitting angle and a second weight. Wherein, the first weight is in positive proportion to the first current, and the second weight is in positive proportion to the second current. For example, the first weight can be a ratio of the first current to the sum of the first current and the second current, and the second weight can be a ratio of the second current to the sum of the first current and the second current, as shown in the following equation (1).

$$\theta = \max\left[\theta 1\left(\frac{y1}{y1+y2}\right), \theta 2\left(\frac{y2}{y1+y2}\right)\right] \quad (1)$$

Here, θ1 denotes a first light emitting angle, θ2 denotes a second light emitting angle, y1 denotes a first current, y2 denotes a second current, and θ denotes a light emitting angle of a lens module 130 to any position.

Figure 2A:
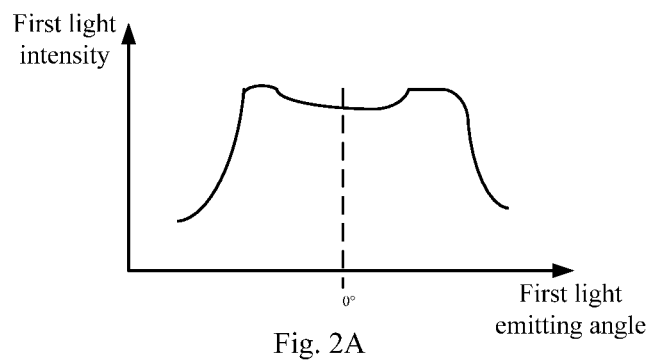
FIG. 2A is a graph of a relationship between a first light intensity and a first light emitting angle according to an exemplary embodiment of the present disclosure.
Figure 2B:
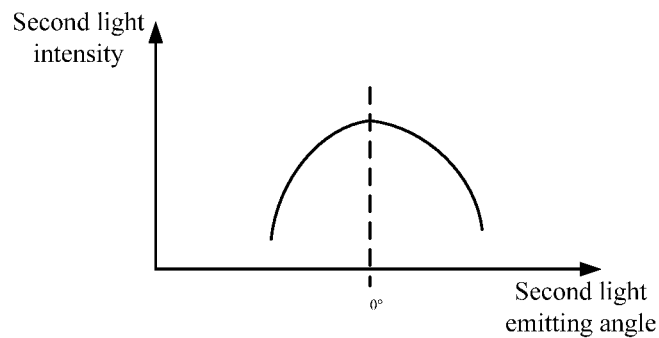
FIG. 2B is a graph of a relationship between a second light intensity and a second light emitting angle according to an exemplary embodiment of the present disclosure.

FIG. 2A shows a relationship between a first light intensity and a first light emitting angle of a first flash light, and FIG. 2B shows a relationship between a second light intensity and a second light emitting angle of a second flash light. It can be seen from FIG. 2A and FIG. 2B that, since the first flash light 110 provides a first light intensity which is smaller, in the embodiments of the present disclosure, the first lens is to provide a first light emitting angle which is larger. That is, the light intensity of the first light transmitted from the center (a position corresponding to 0° as shown in FIG. 2A and FIG. 2B) of the first lens is smaller than the light intensity of the first light transmitted from the periphery of the first lens. Since the second flash light 120 provides a second light intensity which is larger, in the embodiments of the present disclosure, the second lens is to provide a second light emitting angle which is smaller. That is, the light intensity of the second light transmitted from the center (a position corresponding to 0° as shown in FIG. 2A and FIG. 2B) of the second lens is larger than the light intensity of the second light transmitted from the periphery of the second lens. Thereby, the disclosure ensures that when the first flash light and the second flash light operate together, from a position close to the flash light to a position far away from the flash light, and from the plane A close to the flash light to the plane B far away from the flash light, a uniform combined light of the same intensity can be obtained. It should be noted that, FIG. 2A and FIG. 2B merely show an example of a relationship between a light emitting angle and a light intensity, while in practical application, the profile of the relationship may be different depending on different cameras. Nevertheless, it will be always the case that the intensity of the light transmitted from the center of the first lens is smaller than the intensity of the light transmitted from the periphery of the first lens, and the intensity of the light transmitted from the center of the second lens is larger than the intensity of the light transmitted from the periphery of the second lens as long as the first flash light provides a smaller light intensity than the second flash light.

When there are two or more flash lights in the apparatus, the relationship previously stored in the terminal includes a first relationship between position data and a first current and a second relationship between position data and a second current. A first current can be calculated based on the first relationship, and a second current can be calculated based on the second relationship. The first relationship can be a first logarithm relationship, a base number of the first logarithm being greater than 0 and less than 1, as shown in the following equation (2) and a profile X1 in FIG. 3; and the second relationship can be a second logarithm relationship, a base number of the second logarithm being greater than 1 as shown in the following equation (3) and a profile X2 in FIG. 3.

$$y1 = 1 + \log_a x \, (0 < a < 1) \quad (2)$$

$$y2 = 1 + \log_a x \, (a > 1) \quad (3)$$

Here, x denotes position data of the object to be photographed, y1 denotes a first current, and y2 denotes a second current.

Figure 3:
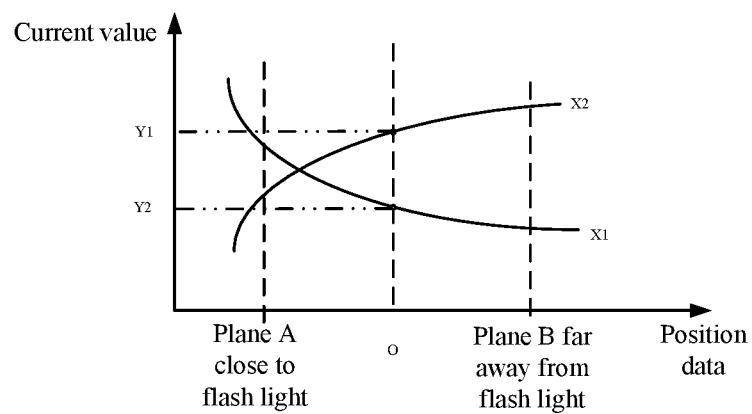
FIG. 3 is a graph of a first relationship and a second relationship according to an exemplary embodiment of the present disclosure.
Figure 4:
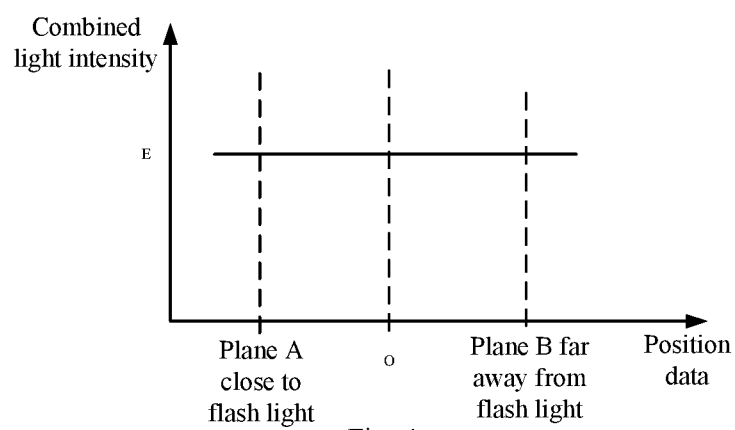
FIG. 4 is a graph of a relationship between a combined light intensity and position data according to an exemplary embodiment of the present disclosure.

Also referring to FIG. 3, it is assumed that the object to be photographed is at a position O. A first current may be calculated based on the equation (2) as Y1, and a second current may be calculated based on the equation (3) as Y2. Thus, the first current Y1 is output to the first flash light module, and the second current Y2 is output to the second flash light module. Then, a light intensity E is generated as shown in FIG. 4. When the object to be photographed moves from the plane A close to the flash light to the plane B far away from the flash light, currents of the first flash light and the second flash light can be respectively calculated based on the equations (2) and (3), thereby it can achieve the same supplementing light intensity, i.e. the same light intensity E of the light combined by the first light and the second light, in any position from the plane A close to the flash light to the plane B far away from the flash light. Accordingly, regardless of the position of the object to be photographed, a supplementing light of the same light intensity may be obtained to obtain a clear photo with uniform light.

Figure 5:
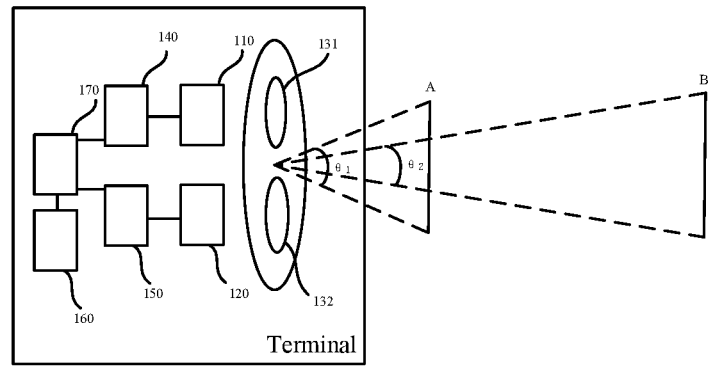
FIG. 5 is a schematic view of an application situation for controlling a flash light according to an exemplary embodiment of the present disclosure.

FIG. 5 is a schematic view of an application situation for controlling a flash light according to an exemplary embodiment. In the application situation, two flash lights are provided, for example. As shown in FIG. 5, the terminal is provided with: a first flash light 110, a first lens 131, a second flash light 120, a second lens 132, a first power source 140 connected to the first flash light 110, a second power source 150 connected to the second flash light 120, a detection module 160 and a control module 170 connected to the first power source 140, the second power source 150 and the detection module 160.

In the embodiments of the present disclosure, the first flash light 110 is to provide a first light of a first light intensity, and the second flash light 120 is to provide a second light of a second light intensity. The second light intensity of the second light may be two times of the first light intensity of the first light. The first lens 130 is disposed corresponding to the position of the first flash light 110, to provide a first light emitting angle for the first flash light 110; and the second lens 132 is disposed corresponding to the position of the second flash light 120, to provide a second light emitting angle for the second flash light 120. As shown in FIG. 5, since the first light intensity is smaller than the second light intensity, the first light emitting angle θ1 is larger than the second light emitting angle θ2. For example, the first light emitting angle θ1 is 80°, and the second light emitting angle θ2 is 50°. The light emitting angles to be provided by the two lenses may be determined based on the equation (1). In addition, when the distance of the object to be photographed is large, the distance between the first lens 131 and the second lens 132 may be neglected, the first light emitting angle θ1 and the second light emitting angle θ2 are shown as having the same vertex, A denotes the plane close to the flash light and B denotes the plane far away from the flash light.

The first power source 140 is connected to the first flash light 110 to provide a first current to the first flash light 110. The second power source 150 is connected to the second flash light 120 to provide a second current to the second flash light 120. It is possible that only one of the first power source 140 and the second power source 150 operates or both of them operate together. Accordingly, it is possible that only one of the first flash light 110 and the second flash light 120 operates or both of them operate together.

The detection module 160 is configured to obtain position data of the object to be photographed. In the embodiments of the present disclosure, the detection module 160 can be a camera, or can be implemented as a detection device dedicated to detect the position of the object to be photographed.

The control module 170 is configured to control the first power source 140 and the second power source 150 to output proper currents, based on the position data detected by the detection module 160. In this situation, the control module 170 is stored with a first preset current, a second preset current, a first relationship between position data of the object to be photographed and a first current, a second relationship between position data of the object to be photographed and a second current.

Thus, in this application situation, the method for controlling the flash light may include: the detection module 160 obtains position data of the object to be photographed, and sends the position data to the control module 170. When the position data indicate that the object is located between the plane A close to the flash light and the plane B far away from the flash light, the control module 170 calculates a first current and a second current corresponding to the obtained position data based on the obtained position data, the first relationship, and the second relationship.

When the obtained position data is closer than the plane A close to the flash light, only the first preset current is output to the first flash light 110 as the first current, that is, the first flash light 110 is driven to flash under the first preset current regardless of the position of the object to be photographed as long as it is closer than the plane A close to the flash light and the second power source 150 is controlled as null, that is, the output current of the second power source 150 is zero and the second flash light 120 does not operate.

When the position data is farther than the plane B far away from the flash light, only the second power source 150 is controlled to output the second preset current to the second flash light 120 as the second preset current, that is, the second flash light 120 is driven to flash under the second preset current regardless of the position of the object to be photographed as long as it is farther than the plane B far away to the flash light and the first flash light 110 is controlled as null, that is, the output current of the first power source 140 is zero and the first flash light 110 does not operate; in case where the position data is located between the plane A close to the flash light and the plane B far away to the flash light, the first power source 140 is controlled to output the calculated first current to the first flash light 110, and the second power source 150 is controlled to output the calculated second current to the second flash light 120, in which case the first flash light 110 and the second flash light 120 operate together, that is, the first flash light 110 flashes under the first current and the second flash light 120 flashes under the second current.

When the object to be photographed is moving, the control module 170 adjusts in real time the currents to be output from the first power source 140 and the second power source 150 based on the position of the object to be photographed detected by the detection module 160, the stored first relationship and the stored second relationship. Thus, the terminal controls the flash lights to ensure that a mixed light of the first light and the second light illuminating the object to be photographed will have a constant light intensity regardless of the position of the object to be photographed.

Because the first flash light 110 is a flash light with a smaller light intensity, for an object to be photographed which is close to the flash light, overexposure resulting unclear image will not occur. Similarly, since the second flash light 120 is a flash light with a larger light intensity, insufficient supplementing light resulting in unclear image will not occur. That is, in this case, the object to be photographed can also be clearly photographed.

It should be noted that the number of the flash light is not limited to one or two, and more than two flash lights can also be provided to implement the embodiments of the present disclosure.

Figure 6:
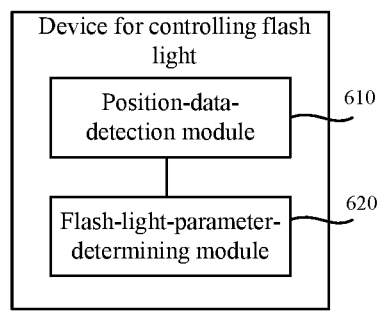
FIG. 6 is a block diagram of a device for controlling a flash light according to an exemplary embodiment of the present disclosure.

FIG. 6 is a block diagram of a device for controlling a flash light according to an exemplary embodiment of the present disclosure. The device may include a position-data-detection module 610 and a flash-light-parameter-determining module 620.

Here, the position-data-detection module 610 is configured to obtain position data of an object to be photographed. The flash-light-parameter-determining module 620 is configured to determine a parameter of the flash light with respect to the object to be photographed based on the position data detected by the position-data-detection module 610.

In the embodiments, the terminal determines different parameters for the flash light based on different positions of the object to be photographed. Compared with the related art in which a light of the same intensity is provided regardless whether the object to be photographed is far away from or close to the flash light, the present disclosure can solve the problem of unclear image due to overexposure when the object to be photographed is close to the flash light, and the problem of unclear image due to weak light intensity when the object to be photographed is far away from the flash light.

Figure 7:
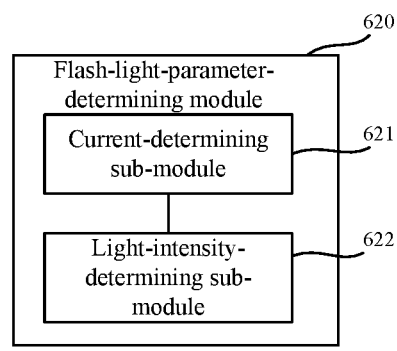
FIG. 7 is a block diagram of another device for controlling a flash light according to an exemplary embodiment of the present disclosure.

FIG. 7 is a block diagram of another device for controlling a flash light according to an exemplary embodiment of the present disclosure. On the basis of the embodiment as shown in FIG. 6, in the present embodiment, the flash-light-parameter-determining module 620 may include a current-determining sub-module 621 and a light-intensity-determining sub-module 622.

Here, the current-determining sub-module 621 is configured to determine a current to be provided to the flash light based on the position data detected by the position-data-detection module 610. The light-intensity-determining sub-module 622 is configured to determine a light intensity of the flash light with respect to the object to be photographed based on the current determined by the current-determining sub-module 621.

In the embodiments, the terminal determines the parameter of the flash light by controlling the current to be provided to the flash light based on the position data of the object to be photographed. The parameter of the flash light may be a light intensity. Thus, a light of different light intensity can be provided to the object to be photographed in different positions, to improve the clarity of the photographing.

Figure 8:
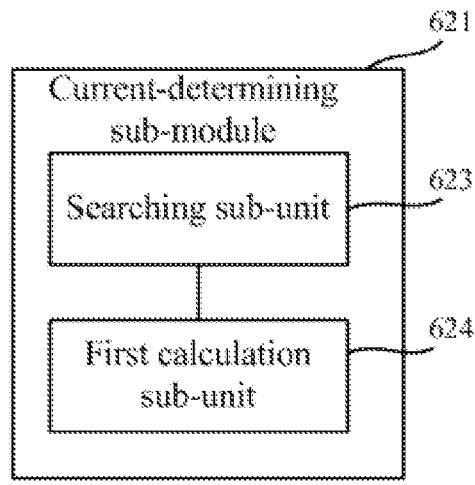
FIG. 8 is a block diagram of another device for controlling a flash light according to an exemplary embodiment of the present disclosure.

FIG. 8 is a block diagram of another device for controlling a flash light according to an exemplary embodiment of the present disclosure. On the basis of the embodiment as shown in FIG. 7, in the present embodiment, the current-determining sub-module 621 may include a searching sub-unit 623 and a first calculation sub-unit 624.

Here, the searching sub-unit 623 is configured to identify a relationship by searching a stored relationship table including position data of the object to be photographed and associated current parameters. The searching sub-unit 623 may retrieve, based on the obtained position data, a current parameter from a predetermined relationship table including position data and associated current parameters. The first calculation sub-unit 624 is configured to, based on the obtained position data and the identified relationship by the searching sub-unit 623, calculate a current corresponding to the obtained position data as the current to be provided to the flash light. The calculation sub-unit 624 may calculate the current to be provided to the flash light based on the obtained position data and the retrieved current parameter.

In the embodiments, the terminal may previously store a relationship between position data and a current. After obtaining the position data of the object to be photographed, the terminal may directly search for a corresponding current, and drive the flash light under the current. Thereby, the terminal can ensure that regardless of the position of the object to be photographed, the light illuminating the object to be photographed will have a constant light intensity.

Figure 9:
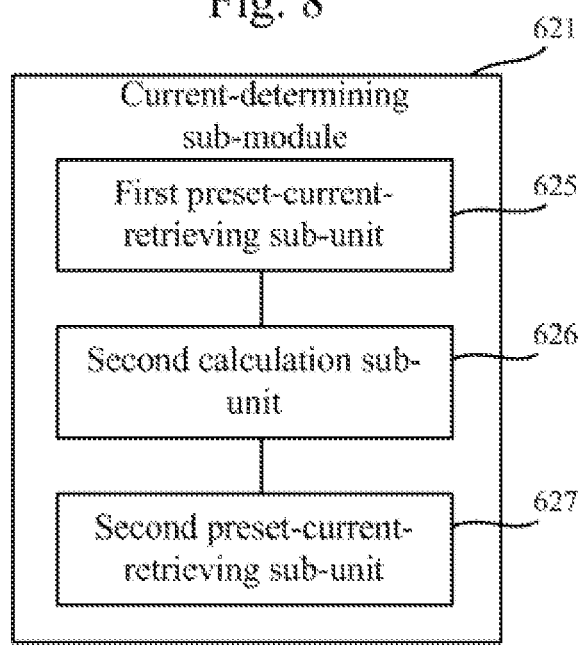
FIG. 9 is a block diagram of another device for controlling a flash light according to an exemplary embodiment of the present disclosure.

FIG. 9 is a block diagram of another device for controlling a flash light according to an exemplary embodiment of the present disclosure. On the basis of the embodiment as shown in FIG. 7, in the present embodiment, the current-determining sub-module 621 may include a first preset-current-retrieving sub-unit 625, a second calculation sub-unit 626 and a second preset-current-retrieving sub-unit 627.

Here, the first preset-current-retrieving sub-unit 625 is configured to, in cases where the position data detected by the position-data-detection module 610 is located closer than a virtual plane close to the flash light, retrieve a stored first preset current as the current to be provided to the flash light. The second calculation sub-unit 626 is configured to, in cases where the position data detected by the position-data-detection module 610 is located between the virtual plane close to the flash light and a virtual plane far away from the flash light, based on the obtained position data and a stored relationship table including position data of the object to be photographed and associated current parameters, calculate a current corresponding to the obtained position data as the current to be provided to the flash light. The second preset-current-retrieving sub-unit 627 is configured to, in cases where the position data detected by the position-data-detection module 610 is located farther than the virtual plane far away from the flash light, retrieve a stored second preset current as the current to be provided to the flash light.

In the embodiments, for an object to be photographed which is closer than the plane close to the flash light or farther than the plane far away from the flash light, the terminal can provide a previously stored fixed current to the flash light. While only for an object to be photographed which is located between the plane close to the flash light and the plane far away from the flash light, the terminal may calculate a corresponding current based on the previously stored relationship table including position data and a current, thereby, it can ensure the clarity of the image.

Figure 10:
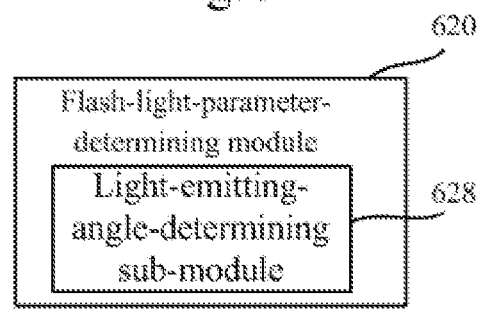
FIG. 10 is a block diagram of another device for controlling a flash light according to an exemplary embodiment of the present disclosure.

FIG. 10 is a block diagram of another device for controlling a flash light according to an exemplary embodiment of the present disclosure. On the basis of the embodiment as shown in FIG. 7, in the present embodiment, the flash-light-parameter-determining module 620 may further include a light-emitting-angle-determining sub-module 628.

Here, the light-emitting-angle-determining sub-module 628 is configured to determine a light emitting angle of the flash light based on the light intensity determined by the light-intensity-determining sub-module 622.

The flash light at least includes a first flash light to provide a first light and a second flash light to provide a second light; the current includes a first current to be provided to the first flash light and a second current to be provided to the second flash light; the light intensity includes a first light intensity of the first light and a second light intensity of the second light; and the light emitting angle is determined according to a first light emitting angle of the first light and a second light emitting angle of the second light.

In some embodiments, a light emitting angle is further determined. For a light having a larger light intensity, a smaller light emitting angle is provided; and for a light having a smaller light intensity, a larger light emitting angle is provided. Thereby, it can ensure that when the first flash light and the second flash light operate together, from a position close to the flash light to a position far away from the flash light, and from the plane A close to the flash light to the plane B far away from the flash light, a uniform combined light of the same intensity can be obtained.

Figure 11:
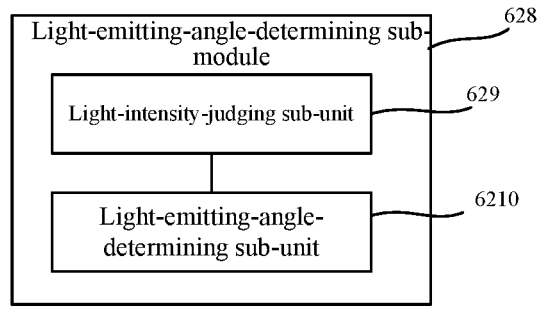
FIG. 11 is a block diagram of another device for controlling a flash light according to an exemplary embodiment of the present disclosure.

FIG. 11 is a block diagram of another device for controlling a flash light according to an exemplary embodiment of the present disclosure. On the basis of the embodiment as shown in FIG. 10, in the present embodiment, the light-emitting-angle-determining sub-module 628 may include: a light-intensity-judging sub-unit 629 and a light-emitting-angle-determining sub-unit 6210.

The light-intensity-judging sub-unit 629 is configured to judge which one of the first light intensity and the second light intensity is larger. The light-emitting-angle-determining sub-unit 6210 is configured to determine a smaller light emitting angle for a light intensity determined as larger by the light-intensity-judging sub-unit 629, and determine a larger light emitting angle for a light intensity determined as smaller by the light-intensity-judging sub-unit 629.

Here, the light emitting angle determined by the light-emitting-angle-determining sub-module 628 is a larger one of a product of the first light emitting angle and a first weight and a product of the second light emitting angle and a second weight, the first weight being in positive proportion to the first current, and the second weight being in positive proportion to the second current.

A relationship between position data and a first current is a first logarithm relationship, a base number of the first logarithm being greater than 0 and less than 1; and a relationship between position data and a second current is a second logarithm relationship, a base number of the second logarithm being greater than 1.

A light combined by the first current and the second current determined by the current-determining sub-module 621 has a constant light intensity regardless of the position data.

In the embodiments as shown in FIGS. 6-11, the position data detected by the position-data-detection module 610 includes a distance between the object to be photographed and the flash light, and an angle formed by a highest point of the object to be photographed, a lowest point of the object to be photographed and the flash light.

Implementation of the functions and operations of the modules in the above devices can specifically referred to the implementation of the corresponding steps in the above methods, which is not repeated herein.

The device may include different hardware and processing circuitries configured to implement the method embodiments. The device described above are merely illustrative. The units described as separate may be or may not be physically separate, and the components illustrated as a units may be or may not be physical units, and may be at the same location, or may be distributed to multiple units over the network. A part of or all of the modules can be selected to achieve the objective of the present disclosure as desired. One skilled in the art can understand and practice the embodiments without paying creative labor.

Correspondingly, the present disclosure provides a terminal. The terminal includes: a processor; and a memory for storing instructions executable by the processor; wherein the processor is configured to perform: obtaining position data of an object to be photographed; and determining a parameter of the flash light with respect to the object to be photographed based on the position data.

Figure 12:
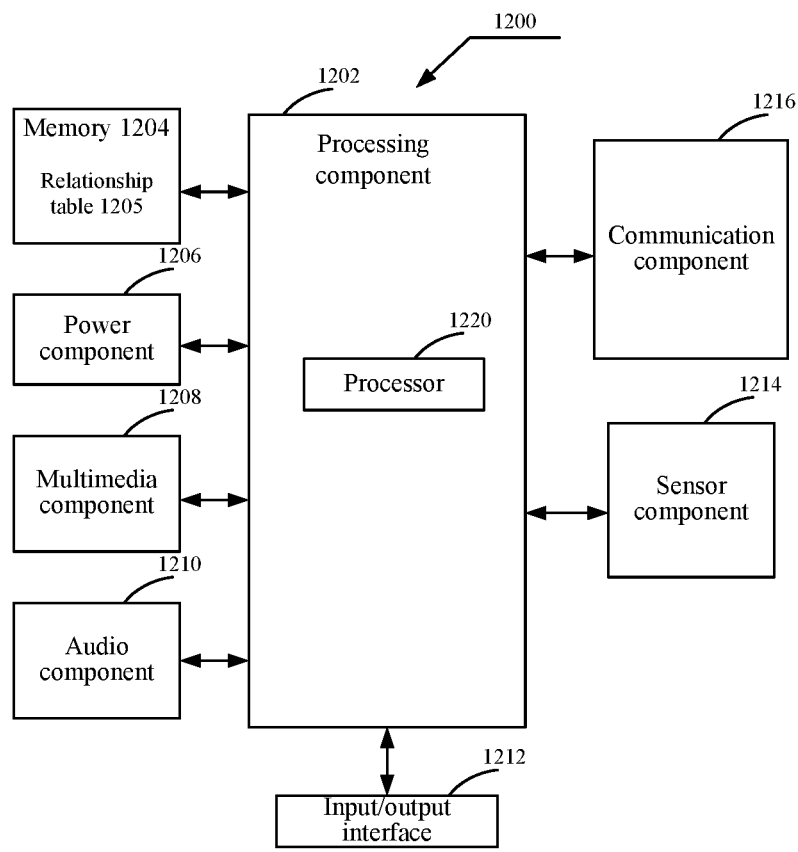
FIG. 12 is a block diagram of a device for controlling a flash light according to an exemplary embodiment of the present disclosure.

FIG. 12 is a block diagram of a device 1200 for controlling a flash light according to an exemplary embodiment of the present disclosure. For example, the device 1200 may be a mobile phone, a computer, a digital broadcast terminal, a messaging device, a gaming console, a tablet, a medical device, exercise equipment, a personal digital assistant, and the like, which can function as a router.

Referring to FIG. 12, the device 1200 may include one or more of the following components: a processing component 1202, a memory 1204, a power component 1206, a multimedia component 1208, an audio component 1210, an input/output (I/O) interface 1212, a sensor component 1214, and a communication component 1216.

The processing component 1202 typically controls overall operations of the device 1200, such as the operations associated with display, telephone calls, data communications, camera operations, and recording operations. The processing component 1202 may include one or more processors 1220 to execute instructions to perform all or part of the steps in the above described methods. Moreover, the processing component 1202 may include one or more modules which facilitate the interaction between the processing component 1202 and other components. For instance, the processing component 1202 may include a multimedia module to facilitate the interaction between the multimedia component 1208 and the processing component 1202.

The memory 1204 is configured to store various types of data to support the operation of the device 1200. The memory 1204 may store the predetermined relationship table 1205 including position data and associated current parameters. Examples of such data include instructions for any applications or methods operated on the device 1200, contact data, phonebook data, messages, pictures, video, etc. The memory 1204 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1206 provides power to various components of the device 1200. The power component 1206 may include a power management system, one or more power sources, and any other components associated with the generation, management, and distribution of power in the device 1200.

The multimedia component 1208 includes a screen providing an output interface between the device 1200 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1208 includes a front camera and/or a rear camera. The front camera and the rear camera may receive an external multimedia datum while the device 1200 is in an operation mode, such as a photographing mode or a video mode. Each of the front camera and the rear camera may be a fixed optical lens system or have focus and optical zoom capability.

The audio component 1210 is configured to output and/or input audio signals. For example, the audio component 1210 includes a microphone ("MIC") configured to receive an external audio signal when the device 1200 is in an operation mode, such as a call mode, a recording mode, and a voice recognition mode. The received audio signal may be further stored in the memory 1204 or transmitted via the communication component 1216. In some embodiments, the audio component 1210 further includes a speaker to output audio signals.

The I/O interface 1212 provides an interface between the processing component 1202 and peripheral interface modules, such as a keyboard, a click wheel, buttons, and the like. The buttons may include, but are not limited to, a home button, a volume button, a starting button, and a locking button.

The sensor component 1214 includes one or more sensors to provide status assessments of various aspects of the device 1200. For instance, the sensor component 1214 may detect an open/closed status of the device 1200, relative positioning of components, e.g., the display and the keypad, of the device 1200, a change in position of the device 1200 or a component of the device 1200, a presence or absence of user contact with the device 1200, an orientation or an acceleration/deceleration of the device 1200, and a change in temperature of the device 1200. The sensor component 1214 may include a proximity sensor configured to detect the presence of nearby objects without any physical contact. The sensor component 1214 may also include a light sensor, such as a CMOS or CCD image sensor, for use in imaging applications. In some embodiments, the sensor component 1214 may also include an accelerometer sensor, a gyroscope sensor, a magnetic sensor, a pressure sensor, a microwave sensor or a temperature sensor.

The communication component 1216 is configured to facilitate communication, wired or wirelessly, between the device 1200 and other devices. The device 1200 can access a wireless network based on a communication standard, such as WiFi, 2G, or 3G, or a combination thereof. In one exemplary embodiment, the communication component 1216 receives a broadcast signal or broadcast associated information from an external broadcast management system via a broadcast channel. In one exemplary embodiment, the communication component 1216 further includes a near field communication (NFC) module to facilitate short-range communications. For example, the NFC module may be implemented based on a radio frequency identification (RFID) technology, an infrared data association (IrDA)

technology, an ultra-wideband (UWB) technology, a Bluetooth (BT) technology, and other technologies.

In exemplary embodiments, the device 1200 may be implemented with processing circuitry including one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods. Each module may take the form of a packaged functional hardware unit designed for use with other components, a portion of a program code (e.g., software or firmware) executable by the processor 1220 or the processing circuitry that usually performs a particular function of related functions, or a self-contained hardware or software component that interfaces with a larger system, for example.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for controlling a flash light, comprising:
   obtaining, by a terminal including a processor configured to communicate with the flash light, position data of an object to be photographed; and
   determining, by the terminal, a parameter of the flash light with respect to the object to be photographed based on the obtained position data and a current parameter,
   wherein determining the parameter of the flash light with respect to the object to be photographed based on the position comprises: determining a current to be provided to the flash light based on the obtained position data; and
   wherein determining the current to be provided to the flash light based on the obtained position data comprises:
   retrieving, based on the obtained position data, the current parameter from a predetermined relationship table comprising position data and associated current parameters; and
   based on the obtained position data and the retrieved current parameter, calculating the current to be provided to the flash light.

2. The method according to claim 1, wherein determining the parameter of the flash light with respect to the object to be photographed based on the position, comprises:
   determining a light intensity of the flash light with respect to the object to be photographed based on the current.

3. The method according to claim 2, wherein determining the current to be provided to the flash light based on the obtained position data, comprises:
   when the obtained position data indicates that the object is located closer than a virtual plane close to the flash light, retrieving a stored first preset current as the current to be provided to the flash light;
   when the obtained position data indicates that the object is located between the virtual plane close to the flash light and a virtual plane far away from the flash light, based on the obtained position data and a current parameter retrieved from a predetermined relationship table comprising position data and associated current parameters, calculating the current to be provided to the flash light; and
   when the obtained position data indicates that the object is located farther than the virtual plane far away from the flash light, retrieving a stored second preset current as the current to be provided to the flash light.

4. The method according to claim 2, further comprising:
   determining a light emitting angle of the flash light based on the light intensity.

5. The method according to claim 4, wherein the flash light at least comprises a first flash light to provide a first light and a second flash light to provide a second light; the current comprises a first current to be provided to the first flash light and a second current to be provided to the second flash light; the light intensity comprises a first light intensity of the first light and a second light intensity of the second light; and the light emitting angle is determined according to a first light emitting angle of the first light and a second light emitting angle of the second light.

6. The method according to claim 5, wherein determining the light emitting angle of the flash light based on the light intensity, comprises:
   determining which one of the first light intensity and the second light intensity is larger; and
   determining a smaller light emitting angle for a light intensity determined as larger, and determining a larger light emitting angle for a light intensity determined as smaller.

7. The method according to claim 5, determining that the light emitting angle is a larger one of a product of the first light emitting angle and a first weight and a product of the second light emitting angle and a second weight, the first weight being in positive proportion to the first current, and the second weight being in positive proportion to the second current.

8. The method according to claim 5, wherein
   determining the first current based on a first logarithm relationship between position data and the first current, the first logarithm using a first base number greater than 0 and less than 1; and
   determining the second current based on a second logarithm relationship between position data and the second current, the second logarithm using a second base number greater than 1.

9. The method according to claim 8, wherein the first flash light and the second flash light produce a combined light having a constant light intensity independent of the position data.

10. The method according to claim 1, wherein the position data comprises a distance between the object to be photographed and the flash light, and an angle formed by a highest point of the object to be photographed, a lowest point of the object to be photographed and the flash light.

11. A terminal, comprising:
    a processor in communication with a flash light;
    a memory for storing instructions executable by the processor, wherein the processor is configured to:
    obtain position data of an object to be photographed; and determine a parameter of the flash light with respect to the object to be photographed based on the obtained position data and a current parameter, wherein the processor is configured to determine the parameter of the flash light with respect to the object to be photographed based on the position by determining a current to be provided to the flash light based on the position data; and wherein determining the current to be provided to the flash light based on the position data, comprises:

retrieving, based on the obtained position data, the current parameter from a predetermined relationship table comprising position data and associated current parameters; and based on the obtained position data and the retrieved current parameter, calculating the current to be provided to the flash light.

12. The terminal according to claim 11, wherein determining the parameter of the flash light with respect to the object to be photographed based on the position, comprises:

determining a light intensity of the flash light with respect to the object to be photographed based on the current.

13. The terminal according to claim 12, wherein determining the current to be provided to the flash light based on the position data, comprises:

when the obtained position data is located closer than a virtual plane close to the flash light, retrieving a stored first preset current as the current to be provided to the flash light;

when the obtained position data is located between the virtual plane close to the flash light and a virtual plane far away from the flash light, based on the obtained position data and a current parameter retrieved from a predetermined relationship table comprising position data and associated current parameters, calculating the current to be provided to the flash light; and when the obtained position data is located farther than the virtual plane far away from the flash light, retrieving a stored second preset current as the current to be provided to the flash light.

14. The terminal according to claim 12, wherein the processor is further configured to perform:

determining a light emitting angle of the flash light based on the light intensity.

15. The terminal according to claim 14, wherein the flash light at least comprises a first flash light to provide a first light and a second flash light to provide a second light; the current comprises a first current to be provided to the first flash light and a second current to be provided to the second flash light; the light intensity comprises a first light intensity of the first light and a second light intensity of the second light; and the light emitting angle is determined according to a first light emitting angle of the first light and a second light emitting angle of the second light.

16. The terminal according to claim 15, wherein determining the light emitting angle of the flash light based on the light intensity, comprises:

determining which one of the first light intensity and the second light intensity is larger; and determining a smaller light emitting angle for a light intensity determined as larger, and determining a larger light emitting angle for a light intensity determined as smaller.

17. The terminal according to claim 15, wherein the processor is further configured to determine that the light emitting angle is a larger one of a product of the first light emitting angle and a first weight and a product of the second light emitting angle and a second weight, the first weight being in positive proportion to the first current, and the second weight being in positive proportion to the second current.

18. The terminal according to claim 15, wherein the processor is further configured to determine the first current based on a first logarithm relationship between position data and the first current, the first logarithm using a first base number greater than 0 and less than 1; and determine the second current based on a second logarithm relationship between position data and the second current, the second logarithm using a second base number greater than 1.

\* \* \* \* \*